(12) United States Patent
Greer

(10) Patent No.: US 10,394,589 B2
(45) Date of Patent: Aug. 27, 2019

(54) VERTICAL REPLICATION OF A GUEST OPERATING SYSTEM

(71) Applicant: International Business Machines Corporation, Armonk, NY (US)

(72) Inventor: Timothy D. Greer, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 15/370,043

(22) Filed: Dec. 6, 2016

(65) Prior Publication Data

US 2018/0157422 A1 Jun. 7, 2018

(51) Int. Cl.
*G06F 11/34* (2006.01)
*G06F 9/455* (2018.01)
*G06F 11/36* (2006.01)

(52) U.S. Cl.
CPC ...... *G06F 9/45558* (2013.01); *G06F 11/3409* (2013.01); *G06F 11/3668* (2013.01); *G06F 2009/45566* (2013.01); *G06F 2009/45583* (2013.01); *G06F 2009/45591* (2013.01)

(58) Field of Classification Search
CPC ............................................ G06F 2009/45566
See application file for complete search history.

(56) References Cited

U.S. PATENT DOCUMENTS

| 4,253,145 | A * | 2/1981 | Goldberg | ............ | G06F 9/45558 703/21 |
|---|---|---|---|---|---|
| 7,752,659 | B2 | 7/2010 | Cromer et al. | | |
| 8,166,492 | B2 | 4/2012 | Fathalla | | |
| 8,949,587 | B2 | 2/2015 | Tsirkin | | |
| 9,015,523 | B2 | 4/2015 | Chahal et al. | | |
| 9,129,106 | B2 | 9/2015 | Sharif et al. | | |
| 2012/0272239 | A1 | 10/2012 | Kalle et al. | | |
| 2014/0229943 | A1* | 8/2014 | Tian | ..................... | G06F 9/45558 718/1 |
| 2014/0244841 | A1* | 8/2014 | Gulati | ................... | G06F 9/5072 709/226 |
| 2017/0329622 | A1* | 11/2017 | Sherwin, Jr. | ........ | G06F 9/45558 |

OTHER PUBLICATIONS

Richard W.M. Jones. "Super-nested KVM." Jul. 2014. https://rwmj.wordpress.com/2014/07/03/super-nested-kvm/.*
Richard W.M. Jones. "run-supernested.sh.in." Jul. 2014. http://git.annexia.org/?p=supernested.git;a=blob;f=run-supernested.sh.in;h=879886c1948ca1321da8b80cc59f18334ef16a90;hb=dcf2db236506b20d96f2ca1ff9d3e5ac5601ea1f.*
Richard W.M. Jones. ".gitignore." Jul. 2014. http://git.annexia.org/?p=supernested.git;a=blob;f=.gitignore;h=0aec8f5a6109ec7c9f662dc221135216ce99ad41;hb=dcf2db236506b20d96f2ca1ff9d3e5ac5601ea1f.*
Richard W.M. Jones. "Copying." Jul. 2014. http://git.annexia.org/?p=supernested.git;a=blob;f=COPYING;h=d159169d1050894d3ea3b98e1c965c4058208fe1;hb=dcf2db236506b20d96f2ca1ff9d3e5ac5601ea1f.*
Richard W.M. Jones. "Makefile.am." Jul. 2014. http://git.annexia.org/?p=supernested.git;a=blob;f=Makefile.am;h=f59a3dee842c75b1c1fb0c7093f745a4a11749ca;hb=dcf2db236506b20d96f2ca1ff9d3e5ac5601ea1f.*

(Continued)

*Primary Examiner* — Nathan Sadler
(74) *Attorney, Agent, or Firm* — Lieberman & Brandsdorfer, LLC

(57) ABSTRACT

Vertical replication of guest operating systems (OS) relating to testing a host machine is provided. A parameter of the host OS is assessed by performing a vertical replication of a guest OS. The vertical replication creates a hierarchy of OSs utilizing one or more virtual disks. The vertical replication concludes in response to a characteristic of the parameter.

19 Claims, 5 Drawing Sheets

(56) References Cited

OTHER PUBLICATIONS

Richard W.M. Jones. "Readme." Jul. 2014. http://git.annexia.org/?p=supernested.git;a=blob;f=README;h=1b2632d5f50e70f8665d3ecdc166071cee98cb6b;hb=dcf2db236506b20d96f2ca1ff9d3e5ac5601ea1f.*

Richard W.M. Jones. "TODO." Jul. 2014. http://git.annexia.org/?p=supernested.git;a=blob;f=TODO;h=74ef93b6587b23836e9977ad3e959ceb863c27c5;hb=dcf2db236506b20d96f2ca1ff9d3e5ac5601ea1f.*

Richard W.M. Jones. "build-supernested.sh.in." Jul. 2014. http://git.annexia.org/?p=supernested.git;a=blob;f=build-supernested.sh.in;h=1d984164a0fd339d758e005e21b95487156fd512;hb=dcf2db236506b20d96f2ca1ff9d3e5ac5601ea1f.*

Richard W.M. Jones. "configure.ac." Jul. 2014. http://git.annexia.org/?p=supernested.git;a=blob;f=configure.ac;h=6a53b325d0664419b21e7d6977315f9329892045;hb=dcf2db236506b20d96f2ca1ff9d3e5ac5601ea1f.*

Richard W.M. Jones. "excludefiles." Jul. 2014. http://git.annexia.org/?p=supernested.git;a=blob;f=excludefiles;h=3d787397ca47bf5a8835a7094cad0aa10142b3a1;hb=dcf2db236506b20d96f2ca1ff9d3e5ac5601ea1f.*

Richard W.M. Jones. "init.in." Jul. 2014. http://git.annexia.org/?p=supernested.git;a=blob;f=init.in;h=84f11fa8d5fb6ea0360b98901dbbc68f67d58311;hb=dcf2db236506b20d96f2ca1ff9d3e5ac5601ea1f.*

Angelos Kyritsis. "Nested Virtualization—How Deep can we Go?" Oct. 2014. https://www.pcsteps.com/508-nested-virtualization/.*

VMWare. "Configuration Maximums." 2013. https://www.vmware.com/pdf/vsphere5/r51/vsphere-51-configuration-maximums.pdf.*

Fabrice Bellard. "qemu (1)—Linux Man Pages." Retrieved Jun. 6, 2018. https://www.systutorials.com/docs/linux/man/1-qemu/.*

Gerard Beekmans. "Linux From Scratch." Mar. 2014. http://www.linuxfromscratch.org/lfs/view/7.5/index.html. Version 7.5. Section 6.6.*

Radvan et al. Red Hat Enterprise Linux 5 Virtualization Guide. 2014. RedHat. https://access.redhat.com/documentation/en-us/red_hat_enterprise_linux/5/pdf/virtualization/Red_Hat_Enterprise_Linux-5-Virtualization-en-US.pdf. pp. 314-315. (Year: 2014).*

Anonymous, A Method of Intelligent Virtual Disk Replication in System Z Centric Hybrid Computing Environments, An IP.com Prior Art Database Technical Disclosure, Feb. 3, 2012.

Sharifi et al., Alamut: A High-Performance Network Intrusion Detection System in Support of Virtualized Environments, Security and Communications Network 2013; 6: 1310-1318, Feb. 12, 2013.

VMWare; "Understanding Snapshots"; Two (2) pages; Full Path: vSphere 4.1—ESX and vCenter > vSphere Virtual Machine Administration Guide > Configuring and Managing Virtual Machines > Managing Virtual Machines > Using Snapshots to Manage Virtual Machines, Understanding Snapshots; Software originally released in Aug. 2010; URL: https://pubs.vmware.com/vsphere-4-esx-vcenter/index.jsp?topic=/com.vmware.vsphere.vmadmin.doc_41/vsp_vm_guide/managing_virtual_machines/c_about_snapshots.html; Retrieved Oct. 8, 2018.

VMWare; "Snapshot Files"; Two (2) pages; Full Path: ESXi and vCenter Server 5.1 Documentation > vSphere Virtual Machine Administration > Managing Virtual Machines > Using Snapshots to Manage Virtual Machines, Snapshot Files; Software originally released in Aug. 2012; URL: https://pubs.vmware.com/vsphere-51/index.jsp?topic=%2Fcom.vmware.vsphere.vm_admin.doc%2FGUID-38F4D574-ADE7-4B80-AEAB-7EC502A379F4.html; Retrieved Oct. 8, 2018.

* cited by examiner

VERTICAL REPLICATION OF A GUEST OPERATING SYSTEM

BACKGROUND

The present embodiments relate to testing a host machine. More specifically, the embodiments relate to vertical replication of a guest operating system.

A virtualized host machine can be configured to run one or more virtual machines. Each virtual machine is allocated a portion of available resources from the host machine and runs an operating system (OS), referred to herein as a host OS, and one or more applications. More specifically, each virtual machine is a software program or OS that not only exhibits the behavior of a separate computer, but is also capable of performing tasks such as running applications and programs like a separate computer. A hypervisor or virtual machine monitor is software, firmware, or hardware that creates and runs virtual machines, and thereby enables the virtualization. Accordingly, the virtualized host OS emulates the underlying hardware of the host machine, making the use of the virtual machine transparent to the OS running in the virtual machine.

A booting of the host OS scans hardware in a predetermined order, until a bootable hardware device is found and the host OS is loaded and booted from the bootable hardware device. Similarly, a booting of a virtual machine of the virtualized host machine includes a loading of a guest OS by the host OS, which scans virtualized hardware in some predetermined order, until a bootable virtual device is found and the virtual OS is loaded and booted from the bootable virtual device.

An OS has a directory and a list of user accounts. A "guest" is referred to as a logged-on user session. The host OS provides various capabilities and the environment to the guest, including, but not limited to, access to memory and data storage. Before the guest starts its own OS, referred to herein as a guest OS, it must first acquire necessary resources, such as read/write storage, which is acquired in the form of virtual disks (VDISKs). Memory required for a VDISK is allocated from the hosting OS's memory.

SUMMARY

A system, computer program product, and method are provided to test a host machine by vertical replication of an operating system (OS).

In one aspect, a system is provided with a processing unit in communication with a memory, and a functional unit in communication with the processing unit. The functional unit has a replicator to perform vertical replication of an OS. The replicator creates one or more virtual disks (VDISKs) in memory assigned to the host OS. The replicator performs an assessment on the available virtual storage space within the memory assigned to the host OS. The replicator performs an assessment on a parameter associated with the host OS utilizing the available virtual storage space. More specifically, the replicator creates a hierarchy of guest OSs utilizing the one or more VDISKs. The replicator assigns a first guest OS, in a replication role, to a first layer in the hierarchy. The replicator vertically replicates the first layer by creating a second guest OS and one or more additional VDISKs in the virtual storage assigned to the first guest OS. The second guest OS is placed in a second layer of the hierarchy. The vertical replication is repeated by placing the second guest OS in the replication role configured to accommodate a third guest OS, with the repetition of the OS replication concluding responsive to a characteristic of the parameter.

In another aspect, a computer program product is provided for testing a host machine. The computer program product includes a computer readable storage device with embodied program code that is configured to be executed by a processing unit. More specifically, program code creates one or more VDISKs in memory assigned to the host OS. Program code performs an assessment on the available virtual storage space within the memory assigned to the host OS. Program code performs an assessment on a parameter associated with the host OS utilizing the available virtual storage space. More specifically, program code creates a hierarchy of guest OSs utilizing the one or more VDISKs. Program code assigns a first guest OS, in a replication role, to a first layer in the hierarchy. Program code vertically replicates the first layer by creating a second guest OS and one or more additional VDISKs in the virtual storage assigned to the first guest OS. The second guest OS is placed in a second layer of the hierarchy. The vertical replication is repeated by placing the second guest OS in the replication role to accommodate a third guest OS, with the repetition of the OS replication concluding responsive to a characteristic of the parameter.

In yet another aspect, a method is provided for testing a host machine. One or more VDISKs are created in memory assigned to the host OS. An assessment is performed on the available virtual storage space within the memory assigned to the host OS. An assessment is performed on a parameter associated with the host OS utilizing the available virtual storage space. More specifically, a hierarchy of guest OSs is created utilizing the one or more VDISKs. A first guest OS is assigned, in a replication role, to a first layer in the hierarchy. The first layer is vertically replicated by creating a second guest OS in the virtual storage assigned to the first guest OS. The second guest OS is created and placed in a second layer of the hierarchy. The vertical replication is repeated by placing the second guest OS in the replication role configured to receive a third guest OS in a third layer of the hierarchy, e.g. a subsequent layer, with the repetition of OS replication concluding responsive to a characteristic of the parameter.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
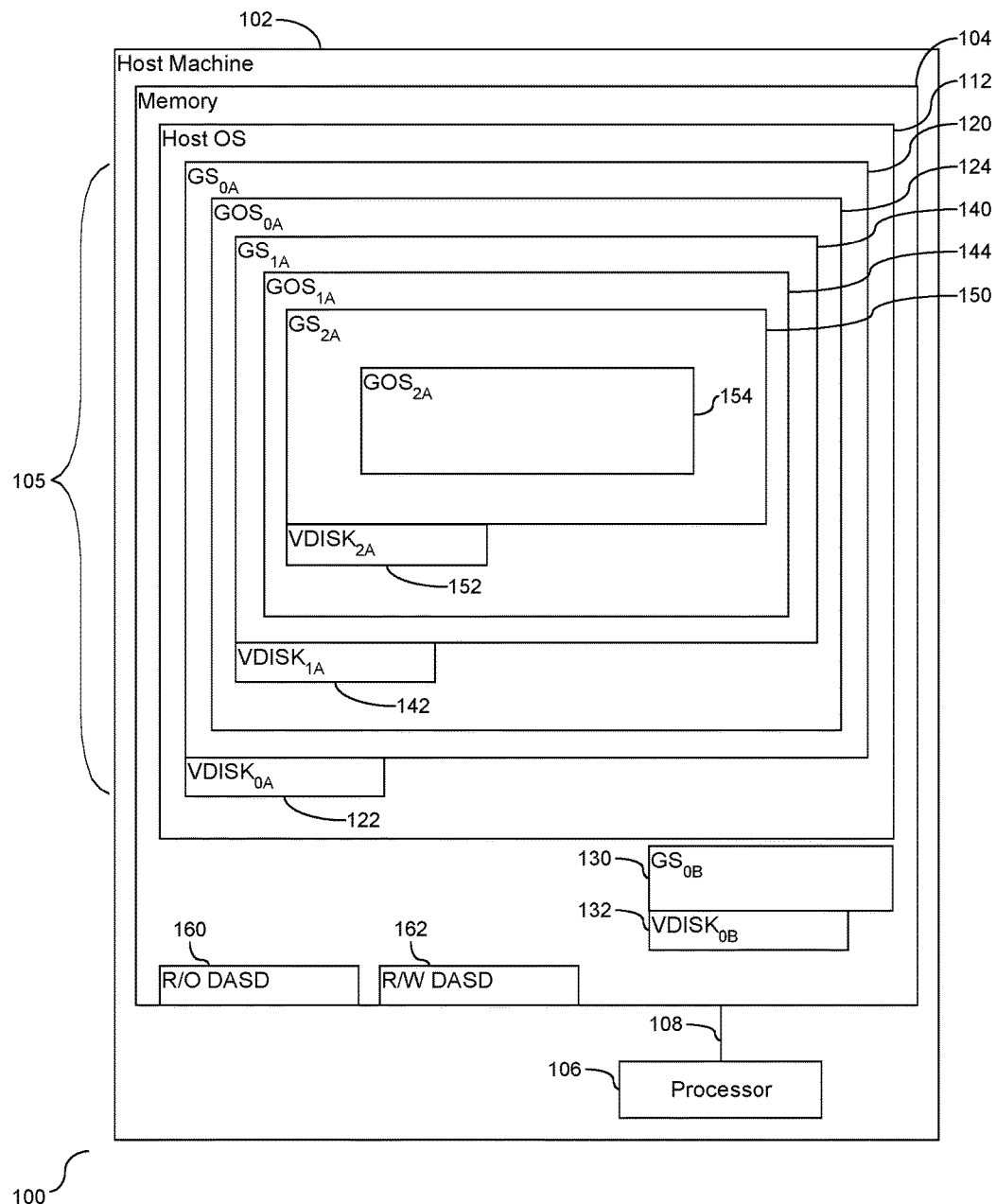
FIG. 1 depicts a block diagram illustrating an arrangement of a host OS and vertically replicated guest OSs.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A system, method and computer program product to test a host machine, while minimizing performance of repetitive tasks, is provided. A host machine is tested by vertical replication of the OS, thereby creating a related guest OS. In one embodiment, the test includes a simulation, where the simulation imitates multiple programs and/or users accessing a host machine and/or host OS. The testing may determine, but is not limited to, memory capacity, performance, functionality, reliability, integrity, bugs, code problems, hangs, crashes, data corruption, and inappropriate responses. In one embodiment, the vertical replication causes the host OS to reuse blocks of memory, thereby challenging the host OS to avoid data corruption. In one embodiment, the system, method, and computer program product improve technology by enabling the simulation to quickly and efficiently test the host machine and/or host OS by defining guest OSs performing non-trivial loads while using substantial amounts of host machine memory. In one embodiment, the capacity assessment minimizes performance of repetitive tasks such as, pagers, thrashers, etc. A repetitive task is performed by a simple program performing a simple task over and over while incrementing a pointer or similar operation. The operation of the vertical replication performs a plurality of tasks and enables the determination of bugs, code problems, hangs, crashes, data corruption, and inappropriate responses that repetitive tasks cannot determine. Accordingly, the simulation performed by the vertical replication of the guest OS functions as a test of the host OS and/or host machine.

Vertical replication of guest OSs creates virtual disks (VDISKs) in memory. A guest OS requires similar resources to a host OS. For example, a guest OS requires necessary system files to define and configure the OS, memory, CPUs, and the like. The necessary files include files that are utilized by an OS to initialize, operate and/or perform a necessary task. The host OS virtualizes the required resources for each guest OS, including allocation of virtual storage to each guest OS. Some files and tasks, which may operate in a read-only mode such as libraries, involved in running a guest OS can be shared between the guest OS and the hosting OS (e.g. a host OS or a lower layer of guest OS in a hierarchical arrangement of guest OSs). Other files and tasks operate in read/write mode which cannot be shared. Accordingly, VDISKs are created in the vertical replication process, and are employed to accommodate the need for read/write storage.

Each guest OS requires a minimum amount of host memory, e.g. virtual storage embedded within the host memory. In one embodiment, host memory utilization increases linearly with the quantity of guest OS embedded within the memory of the host. In one embodiment, each guest OS requires the same amount of virtual storage embedded within the host memory. The size of a guest OS's virtual storage is not limited by the size of the hosting OS's virtual storage. As soon as the sum of the guests' utilization of the host OS's memory exceeds a predetermined amount of the host OS's memory, paging is initiated. Paging allows use of a secondary storage, e.g., stored separate from the host machine, so the guest OS can exceed the size of the virtual storage assigned to the guest OS from the host machine.

An OS comprises a directory and associated user accounts for logging on to the OS. When one of the associated accounts becomes active and initialized, e.g. receives a valid logon, the account is known as a guest session of the hosting OS. A guest session can start a guest OS, a program, or perform no action. In order to start a guest OS, the guest session must acquire the necessary resources, including read/write storage, which the guest acquires in the form of one or more virtual disks (VDISKs). In one embodiment, a directory for the guest OS is placed in the VDISK. Once the necessary VDISKs are acquired and appropriately set up, the guest OS can be started. In one embodiment, an OS allows for multiple simultaneous logins using a single user account.

Referring to FIG. 1, a block diagram (100) is provided illustrating an arrangement of a host OS and vertically replicated guest OSs. As shown, host machine (102) is configured with a processor (106) operatively coupled to memory (104) across a bus (108). Memory (104) is configured with one or more persistent storage devices, including read/writes direct access storage (R/W) (162) and read-only storage (R/O) (160). In one embodiment, the persistent storage devices are a secondary storage device in which each physical record has a discrete location and a unique address, such as a direct-access storage device (DASD). R/O storage (160) is employed to store data that each OS may utilize in read-only mode, and in one embodiment, this data is the same at each level of a hierarchy so that a single copy can be accessed as read-only by all the OSs formed in the hierarchy.

As shown, a host OS (112) is embedded within memory (104) and provides a virtualization of hardware devices and also supports virtualization of the OS. The host OS (112) is shown running in memory (104). As described in FIG. 2 below, the host OS (112) is subject to a vertical replication procedure, which effectively creates a hierarchy of OSs (105) stored in the virtualized storage space (104) of the host OS (112). Accordingly, virtualization of one or more guest OSs within the host OS (112) effectively creates guest OSs in the hierarchy (105) and tests the host OS (112) and as such tests the host machine (102).

The hierarchy (105) is shown herein with multiple layers of guests and guest OSs. It is understood that a hierarchy is an organizational technique in which items are layered or grouped to reduce complexity. In the example shown herein, the hierarchy (105) includes three layers, although this quantity should not be considered limiting. The host OS (112) is shown with a first guest layer in the hierarchy (105), shown herein as guest session $GS_{0A}$ (120) and guest session, $GS_{0B}$ (130). As articulated above and demonstrated in FIG. 2, each guest session acquires the necessary resources to create a successive layer in the hierarchy, including read/write storage, which is shown herein with the guests each acquiring resources in the form of one or more virtual disks (VDISKs), with each VDISK being virtualized storage from their hosting OS's memory (e.g. memory (104), in the case of guest sessions $GS_{0A}$ (120) and $GS_{0B}$ (130)). Guest session, $GS_{0A}$ (120) creates $VDISK_{0A}$ (122), and $GS_{0B}$ (130) creates $VDISK_{0B}$ (132). $VDISK_{0A}$ (122) and $VDISK_{0B}$ (132) are both in the first layer in the hierarchy (105). Accordingly, the first layer in the hierarchy (105) illustrates two guests, each with acquired resources.

Once the necessary VDISKS are acquired, a directory for each of the guest OSs may be separately configured, and each of the guests can separately start an associated guest OS. In the example shown herein, only one of the guests, $GS_{0A}$ (120), in the first layer, creates and initializes a guest OS, shown herein as $GOS_{0A}$ (124) in the first layer of the hierarchy (105). Although only one guest OS is shown in the first layer of the hierarchy (105), this quantity should not be considered limiting. Accordingly, a layer of the hierarchy may include a guest session, VDISKs to support the layer and a guest OS.

Successive layers of the hierarchy may be configured and supported. In the example shown herein, a second guest layer is created in the hierarchy from the guest OS in the first layer, namely $GOS_{0A}$ (124), with the second guest layer having a second guest session, $GS_{1A}$ (140). As shown, guest session $GS_{1A}$ (140), acquires resources, including read/write storage, in the form of one or more VDISKs, shown herein as $VDISK_{1A}$ (142), with each VDISK being virtualized storage from the memory of the hosting OS $GOS_{0A}$ (124). A directory for the guest OS of guest session, $GS_{1A}$ (140) is configured, and guest session, $GS_{1A}$ (140) creates and initializes a guest OS, shown herein as $GOS_{1A}$ (144). Another layer, referred to as a third guest layer, is created in the hierarchy (105) by guest OS, $GOS_{1A}$ (144), with the third guest layer having a third guest session $GS_{2A}$ (150). As shown, guest session $GS_{2A}$ (150), acquires resources, including read/write storage, shown herein in the form of one or more VDISKs, shown herein as $VDISK_{2A}$ (152), with each VDISK being virtualized storage from the memory of the hosting OS $GOS_{1A}$ (144). A directory for the guest OS of guest session $GS_{2A}$ (150) is configured, and guest session, $GS_{2A}$ (150), creates and initializes a guest OS, shown herein as $GOS_{2A}$ (154). In one embodiment, each subsequent layer in the hierarchy has a smaller virtual size than the previous layer. Accordingly, the third layer in the hierarchy (105) is shown herein as containing a guest OS, $GOS_{2A}$ (154), configured with an indirect relationship to the host OS (112) via the direct relationship to the guest OS, $GS_{1A}$ (144).

The layers of OSs shown herein are arranged in a hierarchy in which the guest OSs are layered or grouped. Each subsequent layer of guest OSs in the hierarchy is a vertical replication of the OS in the prior layer in the hierarchical arrangement. In one embodiment, each successive layer of the hierarchy occupies less virtual space than the previous layer. Accordingly, a hierarchy of guest OSs (105) is created by vertical replication in order to test a host OS while minimizing the performance of repetitive tasks.

Figure 2:
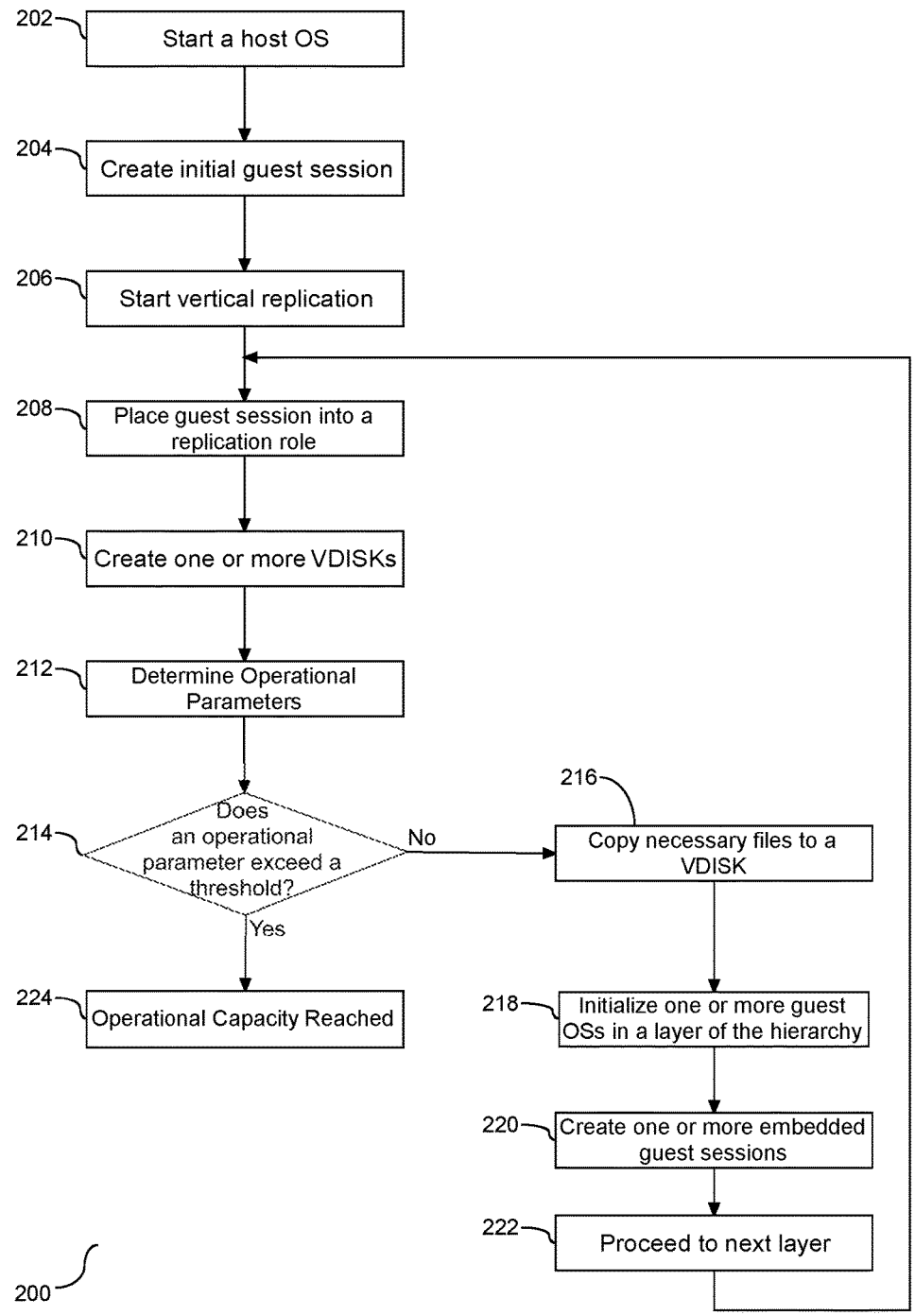
FIG. 2 depicts a flow chart illustrating a method to test a host machine.

Referring to FIG. 2 a flow chart (200) is provided illustrating a method to test a host machine through vertical replication of the OS. As shown, a host OS, including a virtualized environment, is configured and active in a host machine (202). An initial guest session of the host OS is created in the virtualized environment (204). In one embodiment, the host OS is tested for hangs, crashes data corruption and inappropriate responses. In one embodiment, the test of the host machine includes an assessment of available virtual storage space within the memory assigned to the host OS. In one embodiment, the host OS is assigned all available memory in the host machine and controls allocation of the available memory among one or more created guest OSs. Testing and assessment of the host machine is performed through a vertical replication process (206) and placement of a guest session into a replication role (208). Accordingly, a host OS in the host machine supports configuration of one or more guest OSs in a virtualized environment, including vertical replication of multiple guests OSs.

As shown, once the replication role has been defined at step (208), each guest sessions proceeds individually to step (210). Each guest session, in the replication role, creates one or more VDISKs in the memory assigned to the hosting OS that is the subject of the replication (210). The one or more VDISKs are utilized to store necessary system files for running one or more associated OS in the active layer. The necessary system files include a user directory to define the guest OS to be created. The VDISKs are created by and embedded within the active layer performing the replication and are utilized in creation of a subsequent layer. The quantity and size of created VDISKs is such that the virtual storage load of a subsequent layer can be supported by each active layer creating the subsequent layer. Additionally, the quantity of VDISKs created relates to the quantity of guest OSs to be initialized in the active layer. In one embodiment, the size and quantity of VDISKs is dependent on at least one applicable operational parameter. In one embodiment, the host OS is configured with additional paging space to support a guest OS. In one embodiment, when the hosting OS is running in a guest, the additional paging space may be in the form of a VDISK. Accordingly, VDISKs are created by a guest session in order to support creation and execution of a replicated OS.

After creation of the one or more VDISKS at step (210), one or more operational parameters of the system are determined (212). The operational parameters may include, but are not limited to, OS version, available storage space within the host machine, utilization and/or size of memory within the host machine, utilization and/or size of the virtual storage within the host OS and/or a guest OS, quantity of active guest OSs, performance of virtual storage, and performance of the host OS. In order to test the host OS or host machine, a determination is made of whether any of the applicable operational parameters for the guest OS replication meets and/or exceeds a threshold (214). The threshold may be predefined or defined in real-time based on an algorithm. The operational parameter may include, but is not limited to, memory utilization, processor performance, host OS performance, and program code execution performance. If the operational parameter does not exceed the threshold, the replication process continues to step (216) until the threshold is met or exceeded. However, if the applicable operational parameter is determined at step (214) to be equal to and/or greater than the threshold, the guest OS replication process concludes (224). The operational parameter meeting or exceeding a threshold is an indication that related capacity of the host OS or host machine has been reached. In one embodiment, the quantity and size of active guest OSs when the operational parameter meets or exceeds a threshold corresponds to the performance capacity of the host OS or host machine. In one embodiment, the conclusion of the replication is an indication that memory capacity of the system has been reached. Accordingly, continuation of the replication process is dependent on one or more applicable operational parameters.

The necessary system files for a guest OS are copied to at least one VDISK associated with the subject guest OS (216). In one embodiment, a portion of the necessary files for a guest OS may be shared with the subsequent layer being created, with the files being configured or designated as read-only. In one embodiment, each guest OS may be assigned a unique system identifier by modifying the necessary system files in the VDISK and assigning the guest OS a unique system identifier within the necessary system files in the VDISK. One or more guest OSs are initialized in the active layer of a hierarchy of guest OSs utilizing the necessary files from the VDISKs created by and embedded within the active layer (218). In one embodiment, at least one additional VDISK is utilized during initialization of one or more guest OSs. Initializing an OS includes allocating virtual storage from the hosting OS to the guest OS and beginning execution of the OS. During the OS initialization, the host OS and/or host machine is impacted by an initial program load created by initializing the guest OS. In one embodiment, communication between guest OSs can be started during the initialization. In order to create communication among the guest OSs, a link is attached to each guest OS as it is initialized. Accordingly, a layer in the hierarchy having one or more started guest OSs is initialized, with the initialization having a program load impact on the host OS.

The quantity of created guest OSs in each layer is dependent on a plurality of variables including, but not limited to, the quantity of VDISKs created, the VDISK virtual storage space required for paging at each layer, the virtual storage size of each guest OS, the quantity of layers to be created in the hierarchy, the size and/or utilization of the virtual storage space of the host OS, and one or more operational parameters. In one embodiment, the quantity of guest OSs is fixed and at least one of the following variables is dependent on the fixed quantity of guest OSs, the quantity of VDISKs created, the virtual storage space utilized by a VDISK that is required for paging at each layer, the virtual storage size of each guest OS, the quantity of layers to be created in the hierarchy, and the size and/or utilization of the virtual storage space of the host OS. In one embodiment, the amount of virtual storage space, e.g. memory from the host machine that has been virtualized, to allocate to each guest OS is calculated. The calculation may include, but is not limited to, the available virtual storage space of the host OS, the virtual storage size of a guest OS, and the quantity of active guest OSs. In one embodiment, performance and memory constraints of the host machine are challenged by utilization of the VDISKs.

The replication process may be repeated to create additional layers in the hierarchy of guest OSs. Each initialized guest OS may create one or more guest sessions (220) in a subsequent layer in order to continue the replication process. In one embodiment, such as in a situation where the host OS or host machine is being tested or assessed, the replication process automatically proceeds to the next layer in the hierarchy (222) by placing the created one or more guest sessions into a replication role, as demonstrated by a return to step (208). In one embodiment, each successive layer in the hierarchy has a smaller virtual size than the previous layer, e.g. the layer where the guest OS resides that created the successive layer. In one embodiment, the size of each successive layer is related to the size of the first layer wherein the first layer has the largest capacity. The replication process continues to test the host OS or host machine until it is determined at step (214) that an operational parameter exceeds a threshold (224). In one embodiment, the determination that the operational parameter exceeds a threshold at step (214) is an indication that the memory capacity of the host OS or host machine has been reached and the quantity and size of the active guest within the hierarchy correlates to the memory capacity of the host OS or host machine. In one embodiment, the replication process concludes in response to an assessed characteristic of the parameter. In one embodiment, a thrash step may be added at any point throughout the process to utilize more memory of the host OS to test the memory integrity of the host OS. Accordingly, the vertical replication process minimizes repetitive tasks and enables replication of a guest OS until a capacity of the host OS is achieved.

Aspects of testing a host machine involving vertical replication shown in FIGS. 1-2, employ one or more functional tools to support use of a vertical replication. Aspects of the functional tool, e.g. replicator, and its associated functionality may be embodied in a computer system/server in a single location, or in one embodiment, may be configured in a cloud based system sharing computing resources. With references to FIG. 3, a block diagram (300) is provided illustrating an example of a computer system/server (312), hereinafter referred to as a host (312) in communication with a cloud based support system, to implement the processes described above with respect to FIGS. 1-2. Host (312) is operational with numerous other general purpose or special purpose computing system environments or configurations. Examples of well-known computing systems, environments, and/or configurations that may be suitable for use with host (312) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (312) may be described in the general context of computer system-executable instructions, such as program modules, being executed by a computer system. Generally, program modules may include routines, programs, objects, components, logic, data structures, and so on that perform particular tasks or implement particular abstract data types. Host (312) may be practiced in distributed cloud computing environments where tasks are performed by remote processing devices that are linked through a communications network. In a distributed cloud computing environment, program modules may be located in both local and remote computer system storage media including memory storage devices.

Figure 3:
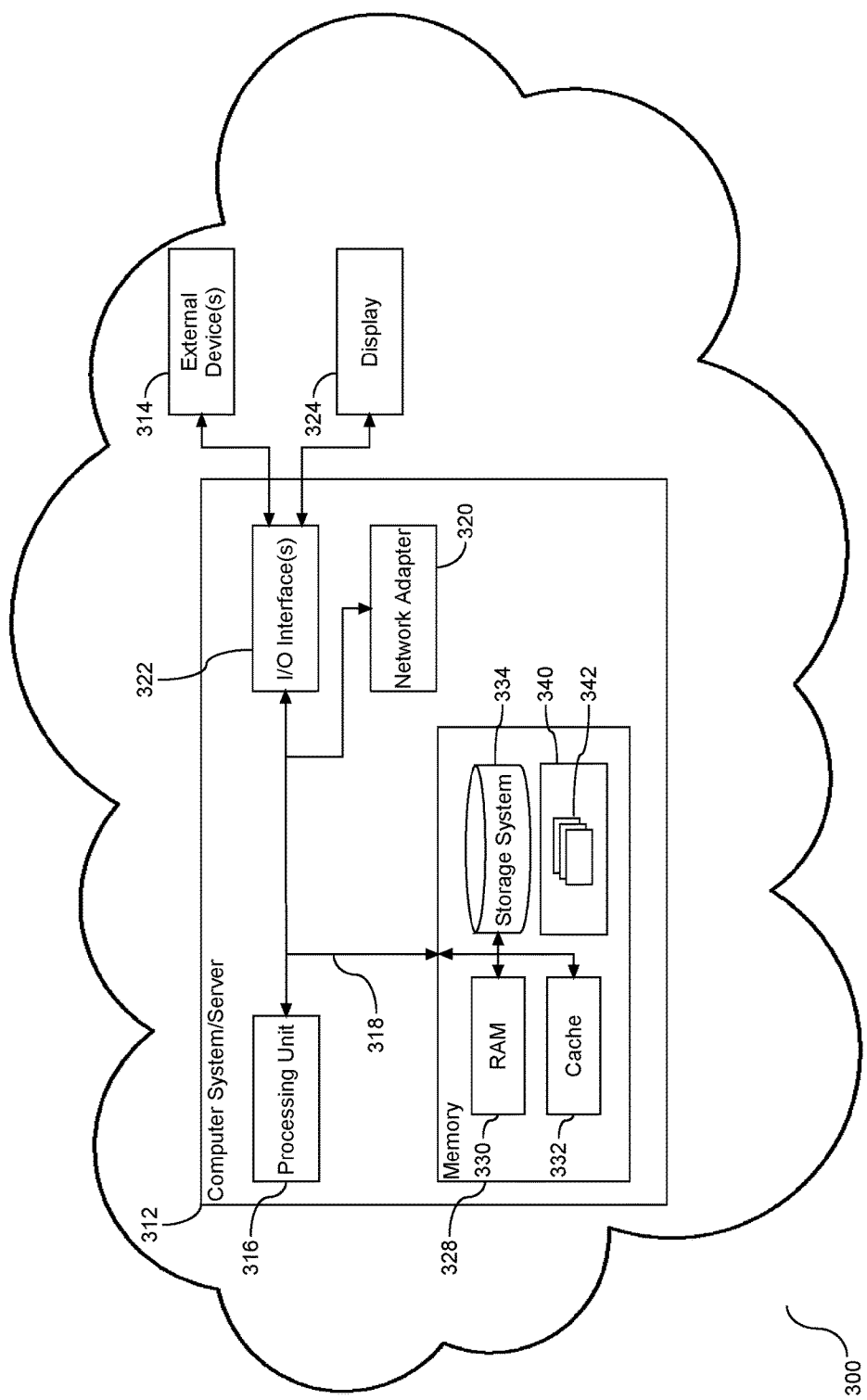
FIG. 3 is a block diagram illustrating an example of a computer system/server of a cloud based support system, to implement the process described above with respect to FIGS. 1-2.

As shown in FIG. 3, host (312) is shown in the form of a general-purpose computing device. The components of host (312) may include, but are not limited to, one or more processors or processing units (316), a system memory (328), and a bus (318) that couples various system components including system memory (328) to processor (316). Bus (318) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (312) typically includes a variety of computer system readable media. Such media may be any available media that is accessible by host (312) and it includes both volatile and non-volatile media, removable and non-removable media.

Memory (328) can include computer system readable media in the form of volatile memory, such as random access memory (RAM) (330) and/or cache memory (332). By way of example only, storage system (334) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (318) by one or more data media interfaces.

Program/utility (340), having a set (at least one) of program modules (342), may be stored in memory (328) by way of example, and not limitation, as well as an operating system, one or more application programs, other program modules, and program data. Each of the operating systems, one or more application programs, other program modules, and program data or some combination thereof, may include an implementation of a networking environment. Program modules (342) generally carry out the functions and/or methodologies of embodiments to store and analyze data. For example, the set of program modules (342) may include the modules configured as a replicator in order to test a host machine by vertical replication of multiple guests as described in FIGS. 1-2.

Host (312) may also communicate with one or more external devices (314), such as a keyboard, a pointing device, etc.; a display (324); one or more devices that enable a user to interact with host (312); and/or any devices (e.g., network card, modem, etc.) that enable host (312) to communicate with one or more other computing devices. Such communication can occur via Input/Output (I/O) interface(s) (322). Still yet, host (312) can communicate with one or more networks such as a local area network (LAN), a general wide area network (WAN), and/or a public network (e.g., the Internet) via network adapter (320). As depicted, network adapter (320) communicates with the other components of host (312) via bus (318). In one embodiment, a plurality of nodes of a distributed file system (not shown) is in communication with the host (312) via the I/O interface (322) or via the network adapter (320). It should be understood that although not shown, other hardware and/or software components could be used in conjunction with host (312). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (328), including RAM (330), cache (332), and storage system (334), such as a removable storage drive and a hard disk installed in a hard disk drive.

Computer programs (also called computer control logic) are stored in memory (328). Computer programs may also be received via a communication interface, such as network adapter (320). Such computer programs, when run, enable the computer system to perform the features of the present embodiments as discussed herein. In particular, the computer programs, when run, enable the processing unit (316) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (312) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
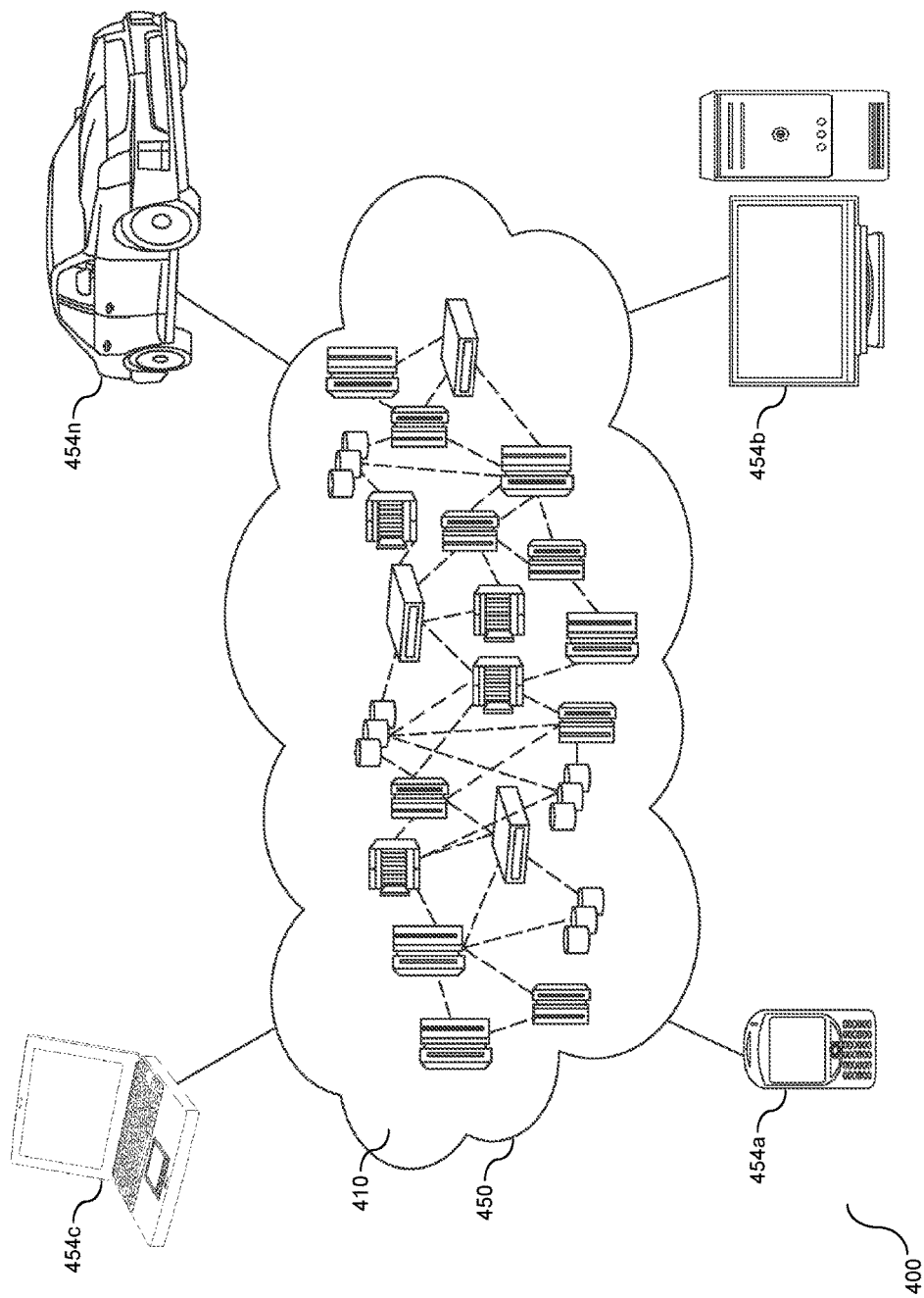
FIG. 4 depicts a block diagram illustrating a cloud computer environment.

Referring now to FIG. 4, an illustrative cloud computing network (400). As shown, cloud computing network (400) includes a cloud computing environment (450) having one or more cloud computing nodes (410) with which local computing devices used by cloud consumers may communicate. Examples of these local computing devices include, but are not limited to, personal digital assistant (PDA) or cellular telephone (454A), desktop computer (454B), laptop computer (454C), and/or automobile computer system (454N). Individual nodes within nodes (410) may further communicate with one another. They may be grouped (not shown) physically or virtually, in one or more networks, such as Private, Community, Public, or Hybrid clouds as described hereinabove, or a combination thereof. This allows cloud computing environment (400) to offer infrastructure, platforms and/or software as services for which a cloud consumer does not need to maintain resources on a local computing device. It is understood that the types of computing devices (454A-N) shown in FIG. 4 are intended to be illustrative only and that the cloud computing environment (450) can communicate with any type of computerized device over any type of network and/or network addressable connection (e.g., using a web browser).

Figure 5:
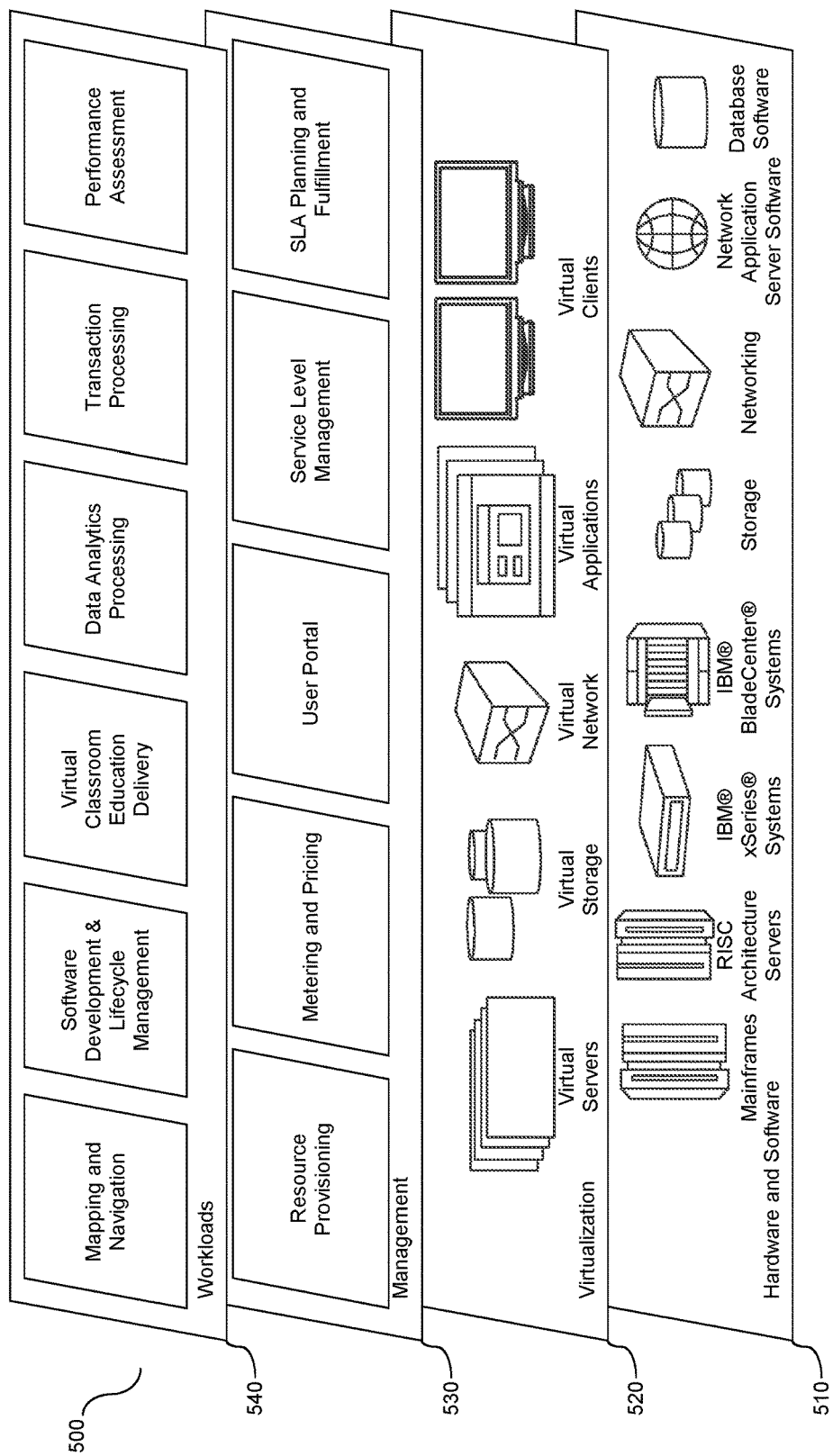
FIG. 5 depicts a block diagram illustrating a set of functional abstraction model layers provided by the cloud computing environment.

Referring now to FIG. 5, a set of functional abstraction layers (500) provided by the cloud computing network of FIG. 4 is shown. It should be understood in advance that the components, layers, and functions shown in FIG. 5 are intended to be illustrative only, and the embodiments are not limited thereto. As depicted, the following layers and corresponding functions are provided: hardware and software layer (510), virtualization layer (520), management layer (530), and workload layer (540). The hardware and software layer (510) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (520) provides an abstraction layer from which the following examples of virtual entities may be provided: virtual servers; virtual storage; virtual networks, including virtual private networks; virtual applications and operating systems; and virtual clients.

In one example, management layer (530) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (540) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and host machine testing through vertical replication.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the implementation of testing a host machine involving vertical replication of guest OS s provides an efficient analysis of the host machine while minimizing repetitive actions.

It will be appreciated that, although specific embodiments have been described herein for purposes of illustration, various modifications may be made without departing from the spirit and scope of the embodiments. In particular, the quantity of layers in the hierarchy and size of the guest sessions and guest OS should not be considered limiting. In one embodiment, the replication of guest OSs may be performed horizontally wherein guest OSs are created in the same layer. In one embodiment, the quantity of guest sessions and/or guest OS s in each layer of the hierarchy is independent of any other layer in the hierarchy. Accordingly, the scope of protection of these embodiments is limited only by the following claims and their equivalents.

What is claimed is:

1. A method for testing a host machine including a processing unit, the method comprising:
  creating one or more virtual disks in memory assigned to a host operating system;
  assessing available virtual storage space within the memory assigned to the host operating system; and
  assessing a an operational parameter associated with the available virtual storage space, wherein the operational parameter corresponds to a performance capacity and comprises a performance limitation of the processing unit, a performance limitation of program code executable by the processing unit, and a performance limitation of the host operating system, including:
    creating a hierarchy of guest operating systems utilizing the one or more virtual disks, including assigning a first guest operating system to a first layer in the hierarchy and assigning the first guest operating system in a replication role;
    vertically replicating the first layer, including creating a second guest operating system and one or more additional virtual disks in the virtual storage assigned to the first guest operating system and placing the second guest operating system in a second layer of the hierarchy; and
    repeating the vertical replication, including placing the second guest operating system in the replication role, wherein a conclusion of the vertical replication is responsive to a characteristic of the parameter, including initiating paging responsive to determining a sum of utilization of the host operating system memory by the created hierarchy of guest operating systems exceeds a predetermined amount, wherein paging augments the virtual storage space with secondary storage.

2. The method of claim 1, further comprising:
  determining a size of a virtual storage assigned to the first guest operating system in the host operating system;
  calculating memory to allocate to each guest operating system based on:
    the assessed available virtual storage space of the host operating system;
    the virtual storage size assigned to the first guest operating system; and
    quantity of active guest operating systems; and
  allocating the calculated memory to each guest operating system.

3. The method of claim 1, further comprising assigning each replicated guest operating system a unique system identifier.

4. The method of claim 1, further comprising starting communication between the first guest operating system and the second guest operating system including attaching a link to the second guest operating system.

5. A computer program product for testing a host machine, the computer program product comprising a computer readable storage device having program code embodied therewith, the program code executable by a processor to:
  create one or more virtual disks in memory assigned to a host operating system;
  assess available virtual storage space within the memory assigned to the host operating system; and
  assess an operational parameter associated with the available virtual storage space, wherein the operational parameter corresponds to a performance capacity and includes a performance limitation of the processor, a performance limitation of the program code, and a performance limitation of the host operating system, including program code to:
    create a hierarchy of guest operating systems utilizing the one or more virtual disks, including assign a first guest operating system to a first layer in the hierarchy and assign the first guest operating system in a replication role;
    vertically replicate the first layer, including create a second guest operating system and one or more additional virtual disks in the virtual storage assigned to the first guest operating system and place the second guest operating system in a second layer of the hierarchy; and
    repeat the vertical replication, including place the second guest operating system in the replication role, wherein a conclusion of the vertical replication is responsive to a characteristic of the parameter, including initiate paging responsive to determining a sum of utilization of the host operating system memory by the created hierarchy of guest operating systems exceeds a predetermined amount, wherein paging augments the virtual storage space with secondary storage.

6. The computer program product of claim 5, further comprising program code to:
  determine a size of a virtual storage assigned to the first guest operating system in the host operating system;
  calculate memory to allocate to each guest operating system based on:
    the assessed available virtual storage space of the host operating system;
    the virtual storage size assigned to the first guest operating system; and
    quantity of active guest operating systems; and
  allocate the calculated memory to each guest operating system.

7. The computer program product of claim 5, further comprising program code to assign each replicated guest operating system a unique system identifier.

8. The computer program product of claim 5, further comprising program code to start communication between the first guest operating system and the second guest operating system including attach a link to the second guest operating system.

9. A computer system comprising:
  a processing unit in communication with a memory; and
  a functional unit in communication with the processing unit having a replicator to perform vertical replication of an operating system, the replicator to:
    create one or more virtual disks in memory assigned to a host operating system;
    assess available virtual storage space within the memory assigned to the host operating system; and
    assess an operational parameter associated with available virtual storage space, wherein the operational parameter corresponds to a performance capacity and comprises a performance limitation of the processing unit, a performance limitation of program code executable by the processing unit, and a performance limitation of the host operating system, the operational parameter assessment including:

create a hierarchy of guest operating systems utilizing the one or more virtual disks, including to assign a first guest operating system to a first layer in the hierarchy and to assign the first guest operating system in a replication role;

vertically replicate the first layer, including to create a second guest operating system and one or more additional virtual disks in the virtual storage assigned to the first guest operating system and place the second guest operating system in a second layer of the hierarchy; and repeat the vertical replication, including place the second guest operating system in the replication role, wherein a conclusion of the vertical replication is responsive to a characteristic of the parameter, including initiate paging responsive to determining a sum of utilization of the host operating system memory by the created hierarchy of guest operating systems exceeds a predetermined amount, wherein paging augments the virtual storage space with secondary storage.

10. The system of claim 9, further comprising the replicator to:

determine a size of a virtual storage assigned to the first guest operating system in the host operating system;

calculate memory to allocate to each guest operating system based on:
 the assessed available virtual storage space of the host operating system;
 the virtual storage size assigned to the first guest operating system; and
 quantity of active guest operating systems; and allocate the calculated memory to each guest operating system.

11. The system of claim 9, further comprising the replicator to assign each replicated guest operating system a unique system identifier.

12. The system of claim 9, further comprising the replicator to start communication between the first guest operating system and the second guest operating system including attach a link to the second guest operating system.

13. The system of claim 9, wherein each virtual disk comprises read and write storage resources to create the hierarchy of guest operating systems.

14. The system of claim 9, wherein:
each virtual disk comprises a directory for the associated guest operating system; and
each directory is separately configured to configure an associated guest operating system for a particular guest user.

15. The system of claim 9, wherein:
each virtual disk comprises system files copied from a host operating system to be used with the associated guest operating system; and
the system files residing in the virtual disk are modified to support a unique system identifier.

16. The system of claim 9, wherein each operational parameter limitation includes a threshold and the vertical replication concludes upon at least meeting one of the thresholds.

17. The system of claim 9, wherein one or more layers of the hierarchy of guest operating systems support two or more guest sessions.

18. The system of claim 9, wherein the hierarchy of guest operating systems comprises more than three layers.

19. The system of claim 9, wherein paging allows use of secondary storage and enables the sum of the guest operating systems sizes to exceed the size of the assigned virtual storage.

* * * * *